US012025974B2

United States Patent
Gorisse et al.

(10) Patent No.: US 12,025,974 B2
(45) Date of Patent: Jul. 2, 2024

(54) SYSTEM AND METHOD FOR SCHEDULING AN AUTOMATION PROCESS CONTROLLING A MACHINE

(71) Applicant: SCHNEIDER ELECTRIC INDUSTRIES SAS, Rueil Malmaison (FR)

(72) Inventors: François Gorisse, Mougins (FR); Jérôme Rebergue, Valbonne (FR); Denis Castang, Mouans Sartoux (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 0 days.

(21) Appl. No.: 16/374,872

(22) Filed: Apr. 4, 2019

(65) Prior Publication Data
US 2019/0317485 A1    Oct. 17, 2019

(30) Foreign Application Priority Data

Apr. 12, 2018 (EP) ..................... 18305454

(51) Int. Cl.
*G05B 19/418* (2006.01)
(52) U.S. Cl.
CPC .......... *G05B 19/41865* (2013.01); *G05B 2219/31225* (2013.01); *G05B 2219/33085* (2013.01)
(58) Field of Classification Search
None
See application file for complete search history.

(56) References Cited

U.S. PATENT DOCUMENTS

| 7,836,168 B1* | 11/2010 | Vasko ................ G05B 19/0421 709/224 |
| 2011/0212714 A1* | 9/2011 | Lobzakov ......... H04M 1/72451 455/416 |
| 2014/0309806 A1* | 10/2014 | Ricci ..................... G06Q 10/20 701/1 |
| 2016/0328683 A1* | 11/2016 | Palavalli ........... G06Q 10/1097 |
| 2018/0005195 A1 | 1/2018 | Jacobson |

FOREIGN PATENT DOCUMENTS

EP    1852758    11/2007

OTHER PUBLICATIONS

Extended European Search Report for European Patent Application No. 18305454.3 dated Sep. 26, 2018, 9 pages.

* cited by examiner

*Primary Examiner* — Mohammad Ali
*Assistant Examiner* — Saad M Kabir
(74) *Attorney, Agent, or Firm* — Locke Lord LLP

(57) ABSTRACT

A system and a method for scheduling an automation process controlling a machine. The system including a parser module for parsing calendar data, the calendar data comprising calendar events including clock data and task data. The system further including a clock module for monitoring time instances and triggering the parser module to parse the calendar data to retrieve the task data of a calendar event that is identified by clock data corresponding to a time instance; and a task module for processing the task data of the calendar event to obtain machine control data for execution on a machine.

18 Claims, 5 Drawing Sheets

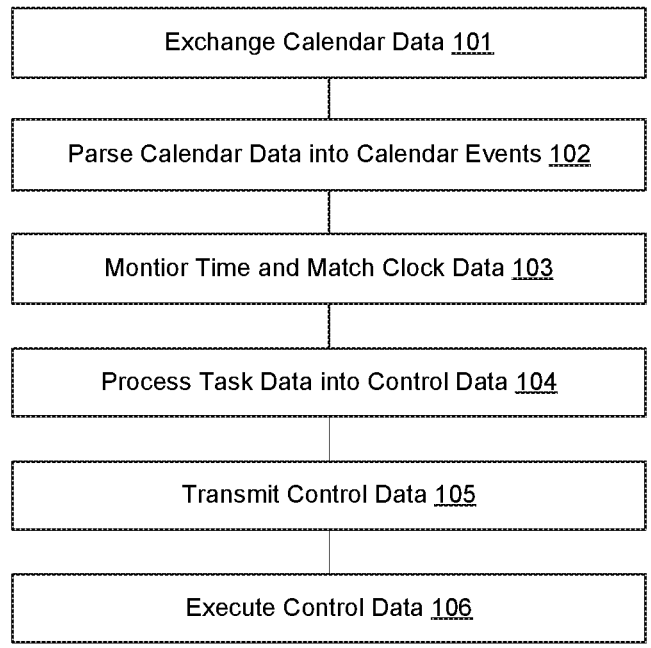

```
┌─────────────────────────────────────────┐
│      Exchange Calendar Data 101         │
└─────────────────────────────────────────┘
                   │
┌─────────────────────────────────────────┐
│ Parse Calendar Data into Calendar Events 102 │
└─────────────────────────────────────────┘
                   │
┌─────────────────────────────────────────┐
│   Montior Time and Match Clock Data 103 │
└─────────────────────────────────────────┘
                   │
┌─────────────────────────────────────────┐
│   Process Task Data into Control Data 104 │
└─────────────────────────────────────────┘
                   │
┌─────────────────────────────────────────┐
│        Transmit Control Data 105        │
└─────────────────────────────────────────┘
                   │
┌─────────────────────────────────────────┐
│        Execute Control Data 106         │
└─────────────────────────────────────────┘
```

FIG. 5

| GMT +02 | THU 5/10 | FRI 6/10 | SAT 7/10 | SUN 8/10 |
|---|---|---|---|---|
| 03:00 | 03:00 - 05:30 WATERING FIELD | 03:00 - 05:30 WATERING FIELD | 03:00 - 05:30 WATERING FIELD | 03:00 - 05:30 WATERING FIELD |
| 04:00 | | | | |
| 05:00 | | | | |
| 06:00 | 05:30 - 06:30 12 M^3 | 05:30 - 06:30 5 M^3 ! | | |
| 07:00 | | | | |
| 08:00 | | 08:00 - 09:00 ISSUE #3 | | |
| 09:00 | | | | |
| 10:00 | | 08:00 - 09:00 CLEAN MAIN FILTER | | |
| 11:00 | | | | |

FIG. 6

SYSTEM AND METHOD FOR SCHEDULING AN AUTOMATION PROCESS CONTROLLING A MACHINE

The present invention relates to a system for scheduling an automation process that controls a machine, and a method for scheduling such an automation process. In particular, the invention relates to a system for scheduling the operation of an industrial automation system that is controlled by an automation process.

BACKGROUND

Industrial automation systems are provided to perform, control and supervise industrial processes. Industrial processes employ Programmable Logic Controllers (PLC) and other automation devices to implement such control. The control includes the programming of the machines and systems for performing the industrial processes. Which is usually done through ERP systems, SCADA systems or other centralized systems. These systems are costly and difficult to set up and manage. In particular, with regard to a simple machinery and processes, the cost and effort of such systems do not justify the use thereof for small sized companies.

Scheduling and planning tasks is also desired for small enterprise, such as for example a bakery starting up its' oven at 05:00 AM in the morning or a crop farm watering its' field at dawn. The usual way to deal with such events in a PLC is to develop a PLC application that checks the internal date and time of the PLC. Which is complex to program and does not provide the look and feel of a planned activity. For example, machine builders may design the same kind of machinery for several customers. But if the machine has to perform a specific action or task at certain scheduled events, such as daily or weekly, the machine builder needs to adapt the machine PLC application according to that particular customer requirement. Accordingly, it is complex for a machine builder to manage such schedules. Neither is it user friendly for a final end user, for example when the schedule of managed events varies a lot or depends on holidays, non-working days, and/or weekends.

SUMMARY OF INVENTION

It is an object of the invention to alleviate the manner in which an automation system may be scheduled to perform an automated process. Thus, to provide an industrial system that may be scheduled in a more simple and direct manner.

According to the invention, this object is achieved by providing a system for scheduling an automation process controlling a machine, the system including a parser module for parsing calendar data, the calendar data comprising calendar events including clock data and task data. The system further including a clock module for monitoring time instances and triggering the parser module to parse the calendar data to retrieve the task data of a calendar event that is identified by clock data corresponding to a time instance; and a task module for processing the task data of the calendar event to obtain machine control data for execution on a machine.

In another aspect, the invention relates to a computer implemented method for scheduling an automation process controlling a machine, the method including: exchanging calendar data between a client device and a machine, parsing the calendar data to retrieve calendar events defined by clock data and associated task data, monitoring time instances and for clock data of a calendar event matching a time instance processing the associated task data of the calendar event to obtain machine control data, and transmitting the machine control data for execution on the machine.

The system and method as disclosed allows a first operator using client device 7 to have credentials to only be allowed to interact with the calendar data of a first control device, whereas a second operator or supervisor using client device may have credentials to be allowed to interact with the calendar data of both the first and a second control device. Other ways of differentiating user rights, as known with regard to calendar management, such as delegation or read-only permission, may be set up using the invention as disclosed.

IEC standard RFC5545 and its' update versions 5546/6868/7529 describe a format for representing and exchanging calendar data across platforms independent of any particular calendar service or protocol, also known as iCalendar. The calendar data may include calendaring and scheduling information such as events, to-do's, journal entries, and free/busy information. The iCalendar format may be advantageously used in a system as disclosed herein.

Further aspects, effects and details of the invention are described in the following detailed description of a number of exemplary embodiments, with reference to the drawings.

BRIEF DESCRIPTION OF DRAWINGS

By way of example only, the embodiments of the present disclosure will be described with reference to the accompanying drawing, wherein:

FIG. 5 is a flowchart of an example of a method in accordance with the invention;

FIG. 6 is a visual representation of calendar data;

DETAILED DESCRIPTION

Figure 1:
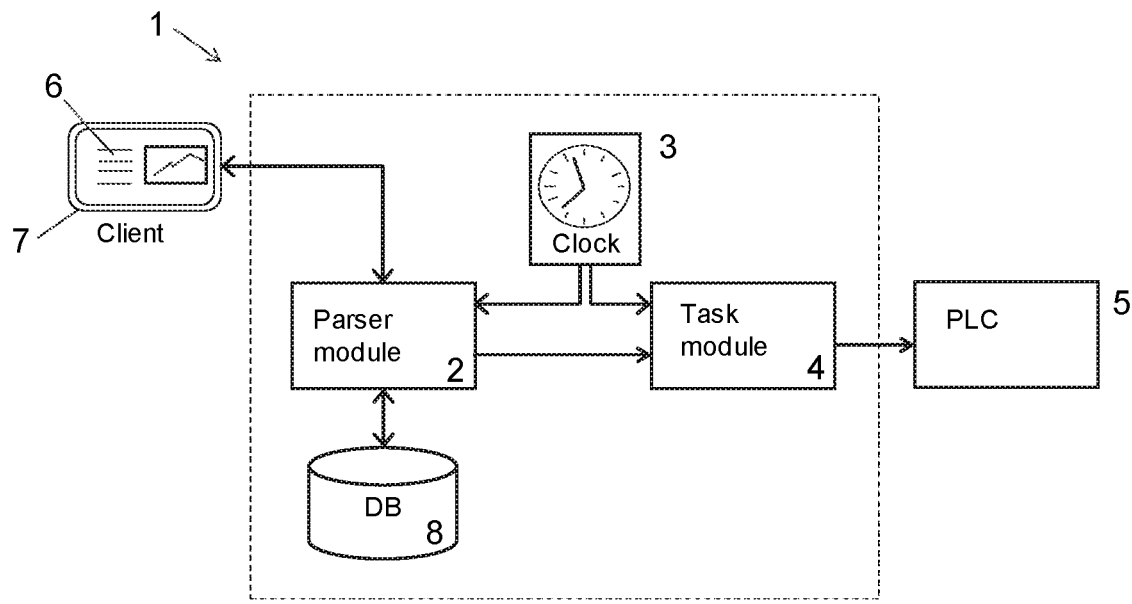
FIG. 1 illustrates schematically an example of a system in accordance with the invention.

Referring to FIG. 1, a schematic overview of an example of a system 1 is shown for scheduling control of an automation process. The system 1 includes a parser module 2, a clock module 3, and a task module 4. The parser module 2 is configured for parsing calendar data. Calendar data consists of one or more calendar events, wherein each event includes clock data and task data. The clock data includes a date and time for the calendar event. The date may be defined as a particular date, a day of the week, a particular day of the month, or any other customary manner of identifying a date. Time may be defined as a particular moment in time, as a period running from a particular moment in time, or as any other suitable and customary way of identifying moments or periods in time. The task data may relate to any type of data relevant to the automation process under control. Thus, the task data may include such commands as start, hold, stop, and/or switch for one or more specific tasks. The task data may further include commands and/or values to set, use, change, read and/or store one or more specific parameters. And it may include any combination of task and parameter commands and/or values. See Table 1 for examples thereof.

TABLE 1

Calendar data

| | | Clock data | | Task data | |
|---|---|---|---|---|---|
| Event 1 | Date | Time | | Start task X | |
| | Date | Time | | Stop task X | |
| Event 2 | Date | Time | Duration: 1 hour | Run task X for [Duration] | |
| Event 3 | Date | Start time | End time: when parameter P = value | Run task Z | Parameters: P, Q, R |
| Event 4 | Date | Time | | Start task X | |
| | Date | Time | | Stop task X, start task Y | |
| | Date | Time | | Stop task Y | |

As one possible example of a format for calendar data the Event Title may define the automation task to be performed and the Event Body may define a recipe, parameters, and other necessary details. A recipe herein refers to a combination of partial tasks i.e. steps and parameters to be used for each step.

The clock module 3 is configured for monitoring time instances i.e. keeping time. The clock module 3 is further configured to periodically check the parser module 2 for calendar events of which the clock data corresponds to specific time instances and keep track of any identified time instances. The clock module 3 is further configured to trigger, at a particular identified time instance, the parser module 2 to parse the calendar data of the calendar event that is identified by the clock data of the corresponding time instance. The parsing of calendar data serves to retrieve the task data of the calendar event.

In this example, the clock module is arranged for keeping an internal time independently by means of, for example, an internal oscillator generating a periodic clock signal. In other examples, the clock module may retrieve time indications from an external time indicator provider, such as for example a periodic clock signal from an external source or a time value from an external clock. In yet another example, the clock module may be synchronizing the internal time with an external time signal.

The task module 4 is configured for receiving the task data of the calendar event, processing the task data, and transmitting machine control data such as signals and/or messages in accordance with the task data. For example, the task data may be taken from the header of the calendar event "turn on watering" which then needs to be translated into the required machine operations. The machine control data is transmitted to a control device 5 performing control of the automation process, in this example a Programmable Logic Controller PLC.

The system 1 of FIG. 1 further includes a storage module 8 for storing the calendar data. The storage module 8 may be organized as a single file or set up as a database. The storage device 8 may be connected directly to the parser module 2, as in this example, or it may be integrated within the parser module.

An operator of the automation process may interact with the system 1 via a calendar application 6 on a client device 7. The system 1 is arranged for exchanging calendar data with the client device 7. This may be set up and managed through the parser module 2 or it may be mediated directly by allowing the calendar application 7 direct access to the storage module 8. The client device 7 may be any kind of device capable of providing a machine-user interface, such as SCADA or HMI, and/or a smartphone, tablet or personal computer. The calendar application may take the form of any suitable program, such as a website or webpage, an MS Outlook/Exchange calendar, a calendar application based on Android, Linux or other operating system, a mobile phone calendar application or even just an HTML based web application. Basically, the calendar application may be any program employing a calendar protocol, and more preferably the iCalendar protocol.

Furthermore, the calendar data may contain a calendar event containing task data that triggers the system to retrieve new calendar data from an external server, cloud infrastructure or other remote source. Thus, instead of an operator interacting directly with the storage module pushing new data, the system itself may initiate updating the calendar data.

In addition, the scheduling system may be arranged for sending calendar updates to an operator or user by means of SMS, eMail or any other suitable messaging platform.

Figure 2:
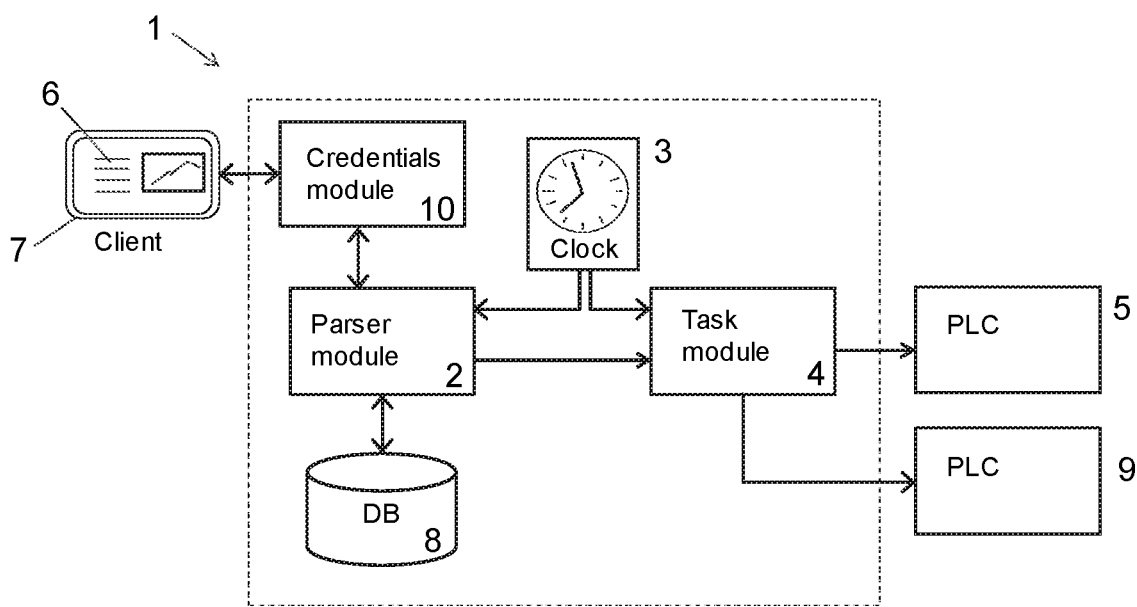
FIG. 2 illustrates schematically another example of a system in accordance with the invention.

In another example, shown in FIG. 2, the system 1 further includes a credentials module 10 for managing and authenticating user accounts, service accounts, user credentials and service credentials. Accordingly, the credentials module 10 will manage interaction and access of the calendar application 6 of the client device 7 with the calendar data, whether mediated through the parser module 2 or available directly from the storage module 8. In some embodiments, the credentials module 10 may be an integral part of the parser module 2.

One way for implementing authentication policies is by means of a key infrastructure using public and private keys; though other means may be considered. In case of machine-to-machine i.e. PLC-to-PLC communication, a first machine may access and amend calendar data of a second machine directly if it promptly authenticates itself. Or the first machine may provide an entry for calendar data as part of an email to the second machine being the owner of the calendar data.

Furthermore, the system 1 may be arranged for scheduling an additional automation process controlled via a second control device 9. The system 1 may be configured to allow presentation of the calendar data of the two distinct automation processes as separate calendars. This may be achieved via the storage module 8 storing the calendar data of two or more automation processes separately. Or it may be achieved by the credentials module 10, the storage module storing all calendar data jointly, and the credentials module 10 separating or splitting the calendar data according to the user and/or service credentials. In addition, the calendar application 6 of the client device 7 may identify and handle the calendar data as separate calendars, allowing to show the calendars individually, next to one another, in overlay or any other suitable known manner for displaying calendar information.

Figure 3:
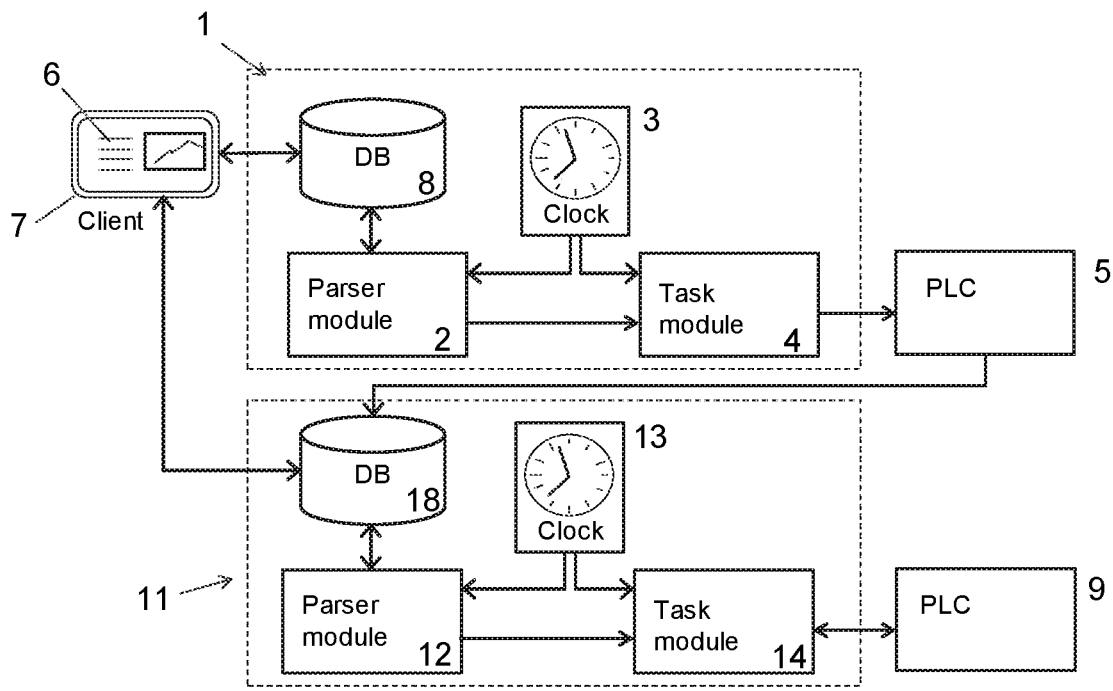
FIG. 3 illustrates schematically yet another example of a system in accordance with the invention.

In another example, shown in FIG. 3, the client device 7 may be set up for interacting with a second system 11. The second system 11, including a parser module 12, a clock module 13, a task module 14, a storage module 18, and optional credentials modules as described in relation with FIGS. 1 and 2. In this manner, the calendar application 6 of the client device 7 may handle the calendar data as separate calendars, allowing to show the calendars individually, next to one another, in overlay or any other suitable known manner for displaying calendar information. Moreover, the operator may interact with the calendar data of both system 1 and system 11 via the calendar application 6.

The systems 1, 11 may be implemented on a server, which then connects to control devices 5 and/or 9. The systems 1, 11 may also be implemented as part of such control devices, thus within the PLC 5, 9 or a Real Time Operating System RTOS. The system 1, 11 may further be implemented as stand alone, only allowing access on local premises or it may be implemented using a cloud infrastructure. Furthermore, the various modules of the system may also be distributed as various firmware modules or hardware components.

As an alternative, or even in addition to the client device interacting with one of the scheduling systems, one of the PLCs may also be set up to interact with the scheduling system of the other PLC. As shown in the example in FIG. 3 not only the client device 7 may interact with the second system 11, also the PLC 5 is set up to interact with the second scheduling system 11. Then, for example by means of suitably programmed IEC Function Blocks, the PLC 5 may request the second scheduling system 11 to add a calendar event to its' calendar data; which may be stored in the storage module 18.

Figure 4:
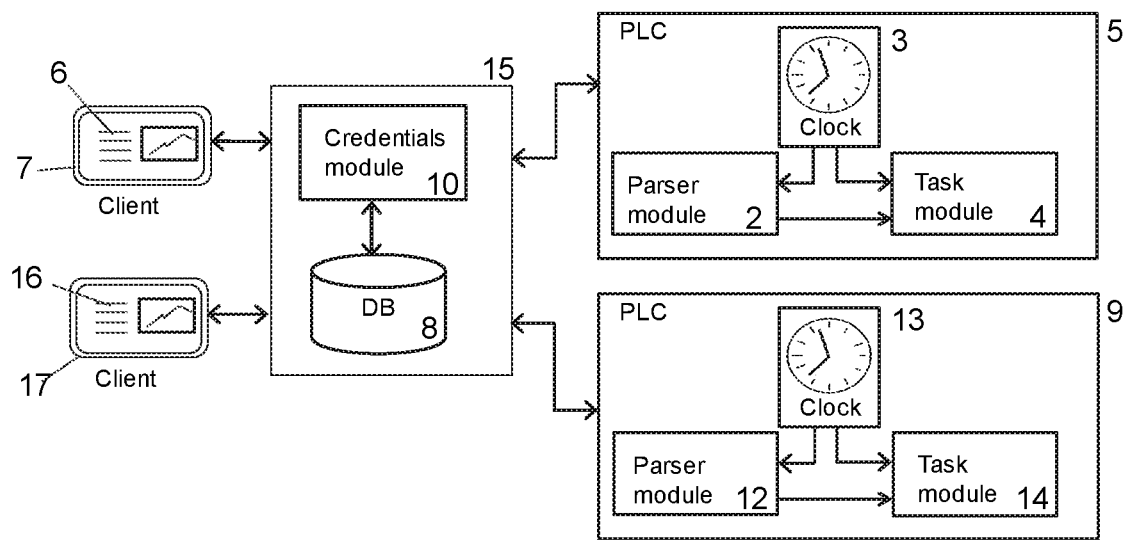
FIG. 4 illustrates schematically another example of a system in accordance with the invention.

An example of a distributed system is shown in FIG. 4. A server 15 includes an operating system that hosts the storage module 8 and the credentials module 10. Again, the server may be a local server on the premises of the machine owner, or it may be a remote server or cloud server. Control devices 5 and 9 each host their own respective parser modules 2, 12, clock modules 3, 13 and task modules 4, 14. Calendar data of both control devices 5, 9 is stored in the storage module 8. Different client devices 7, 17 may connect and interact with the calendar data available on the server subject to credentials module 10. In this manner, a first operator using client device 7 may have credentials to only be allowed to interact with the calendar data of control device 5, whereas a second operator or supervisor using client device 17 may have credentials to be allowed to interact with the calendar data of both control devices 5 and 9. Other ways of differentiating user rights, as known with regard to calendar management, such as delegation or read-only permission, may be set up using the invention as disclosed.

Referring to FIG. 5, an example of a method for scheduling an automation process controlling a machine is shown. The method includes exchanging 101 calendar data between a client device and a scheduling system of a machine. The exchanged calendar data is parsed 102 to retrieve calendar events that are defined by clock data and associated task data. Time instances, which are represent a date and time, are monitored 103. And for clock data of a calendar event matching a time instance, the associated task data of the calendar event is processed 104 to obtain machine control data. The machine control data is transmitted 105 for execution on the machine, which depending on the set up, for example is transmitted to a control device or a control system of the machine.

For sake of completion, in this example it is shown that as a final step the machine control data is executed 106 on the machine that is controlled by the automation process.

In some embodiments, the moment of transmitting 105 the machine control data may follow directly on finishing the processing 104 of the task data, in which case the time monitoring will trigger the processing the task data of a calendar event at the exact time of the matched clock data. In other embodiments, the moment of transmitting the machine control data may be the time instance that matches the clock data of the calendar event, in which case the task data is fetched for processing ahead of the time instance that matches the clock data.

The method may be implemented on a server, which then connects to control devices of a machine. The method may also be implemented as part of such control devices, thus within e.g. a PLC. Or it may be executed as program on a Real Time Operating System RTOS running on a PLC or a desktop PC being connected to a machine. The method may be implemented as stand alone, only allowing access on local premises or it may be implemented using a cloud infrastructure. Furthermore, the various modules of the system may also be implemented as software objects and distributed over various hardware components as mentioned above.

For programming of sequential controls systems, such as PLC devices and systems based thereon, various IEC standardized languages are available such as Ladder Logic, Structured Text and Instruction List. Also Sequential Function Charts SFC have been established as an adequate instrument for design and implementation of process flow control. Programming standard IEC 61131-3 for example describes a graphical implementation of Sequential Function Charts for programming PLCs. In the following example, it will be described how the disclosed system and method allow to convert an SFC into calendar data and vice versa, thus providing a direct link between calendar data and the control program of a PLC.

Shown in FIG. 6 is an example of a familiar representation of calendar data. The calendar relates to a control system of a watering plant for a crop field. Time slots are shown in a left column, dates and associated days of the week are shown in a top row. For example, for Thursday October $5^{th}$ an event containing a weather forecast for the coming day is present, which in this example is retrieved at 02:00. It further shows to water the field from 03:00 to 05:30, thus the event "watering field" is to be performed for 2.5 hours starting at 03:00 AM. The result of the event "watering field" is shown as an event at 05:30, indicating that 12 m^3 of water was used for the field. For October $6^{th}$, the calendar again shows to water the field from 03:00 to 05:30. But now the event showing the result indicates that only 2 m^3 of water was used. This implied an issue which was analysed and reported as an event 08:00. To address the issue, a further event is created indicating that a main filter of the watering system needs to be cleaned.

In the calendar, the event showing the result may have a certain color as an indication of success or failure; a familiar color coding would e.g. include green and red. More in general, any event shown in the calendar may be shown in a particular color as a visual indication to the user.

In order to perform the actions of the automation process according to the schedule stored in the calendar data, and as visualized by the calendar representation of FIG. 6, an SFC is designed capable of controlling the events while taking in account the associated parameters.

Figure 7:
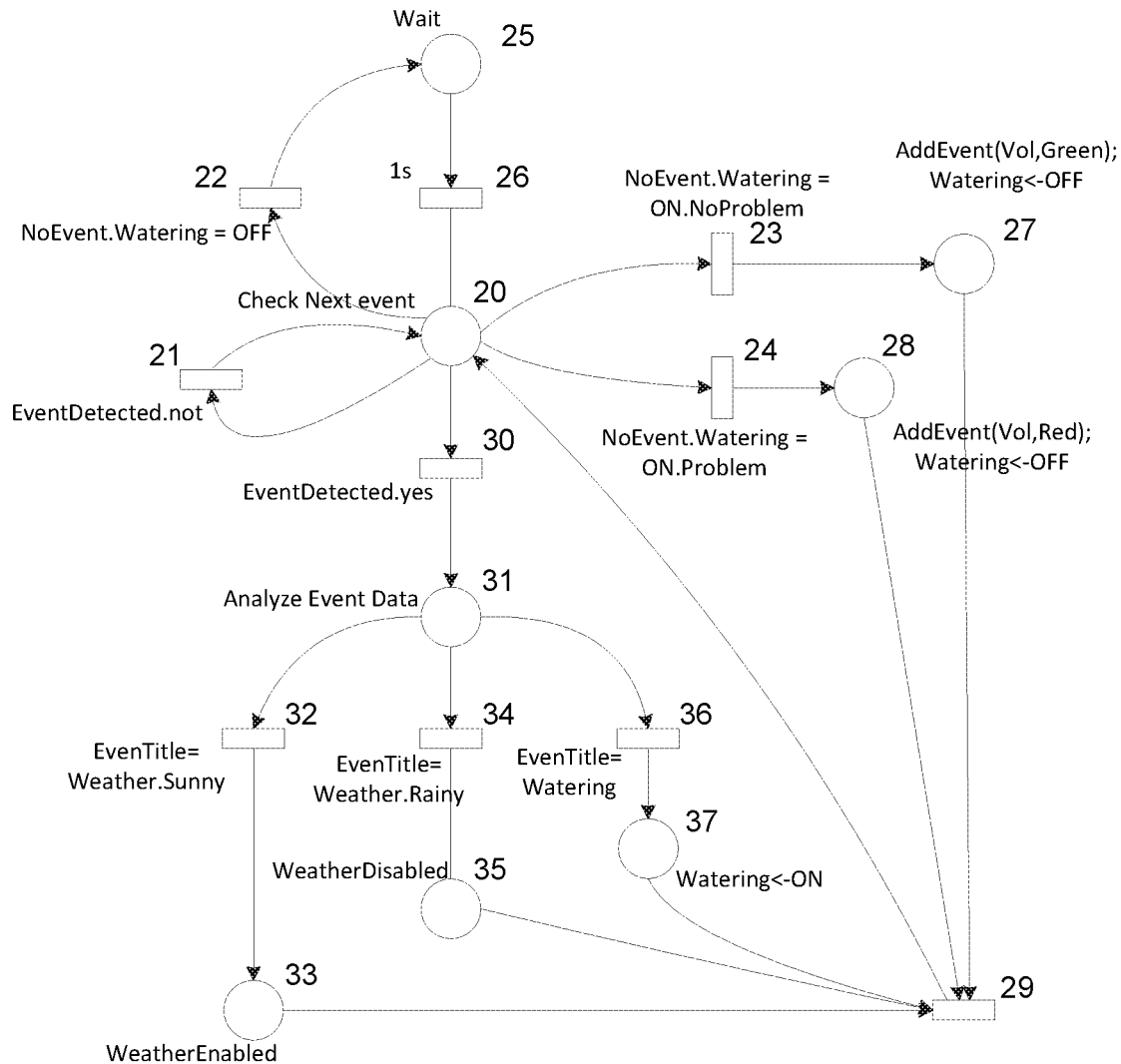
FIG. 7 is a sequential flowchart corresponding to the calendar data represented in FIG. 6.

Shown in FIG. 7 is an example of a Sequential Function Chart that corresponds to the calendar data visualized in the calendar representation of FIG. 6. The SFC consists of Steps represented by spheres and transitions between Steps represented by vertical bars. Each Step is associated with one or more actions and each transition is associated with one or more conditions i.e. set of conditions. If the set of conditions for a particular transition is fulfilled, that transition will lead to the next Step: meaning that on transition the actions of previous Step are deactivated and the actions of the next Step are activated.

The SFC starts at Step Check next Event 20, which checks for a next event in the calendar data. If no event is recognized, the value EventDetected=NoEvent, as indicated by transition 21. Together with the value for Watering, which may be OFF or On, NoEvent forms a condition set for a further three possible transitions 22, 23, 24. In case of NoEvent and Watering=OFF, the next Step is Wait 25. From Wait 25 the only possible transition 26 depends on the condition of a time lapse of 1 second, on the expiration of which Step Check next Event 20 is activated again.

In case of NoEvent and Watering=ON, two transitions 23, 24 are possible, depending on a third condition indicating whether a problem occurred, thus status=Problem or NoProblem. If no problem occurred during watering for 2.5 hours i.e. 9000 seconds, transition 23 leads to Step Add success Result 27. This step will turn off the watering and will add a calendar event to the calendar data indicating the amount used for watering the crop field and an indication to show that result in e.g. green. If a problem does occur, for example due to a lack of water supply, the system will generate an alert indicating the occurrence of that problem. Then the condition set NoEvent, Watering=ON, and Problem of transition 24 leads to Step Add fail Result 28. Step Add fail Result 28 will also turn off the watering and will add a calendar event to the calendar data indicating the amount used for watering the crop field and an indication to show that result in e.g. red, indicating the failure. From both Step 27 and 28 the system will move via transition 29 back to Step Check next Event 20.

At Step Check next Event 20, in case an event is recognized, the EventDetected=yes fulfills the condition of transition 30 leading to Step Analyze event Data 31.

The recognized event may be the weather forecast retrieved at 02:00 AM forecasting a sunny day or a rainy day. Thus, depending on the event title being Weather.Sunny or Weather.Rainy, the system will move via transition 32 to Step enable Watering 33 or via transition 34 to Step disable Watering 35; which steps will respectively enable or disable the watering system.

The recognized event may also be the event Watering intended to start at 03:00 AM and to continue for 2.5 hours till 05:30 AM. In that case the event title watering will fulfill the condition of transition 36 and result in Step Turn watering ON 37.

Finally, from each Step 33, 35, and 37 the system will move via transition 29 back again to Step check next Event 20.

In the above example for watering a crop field, it is shown how the same calendar data may both be visualized as a calendar representation and be processed into machine control data for providing the required actions, parameters and values to be executed by the automation process controlling the machine.

As can be seen in the SFC example, the Step Check next Event 20 is a cyclic task that periodically checks for new events in the calendar data. Accordingly, the clock module 3 of the disclosed system for scheduling an automation process not only keeps time and monitors the time instances, but also orchestrates the time dependent behavior of the system by triggering the parser module 2 to retrieve the scheduled actions at the appropriate time instance. Similar considerations apply to the disclosed method.

Figure 8:
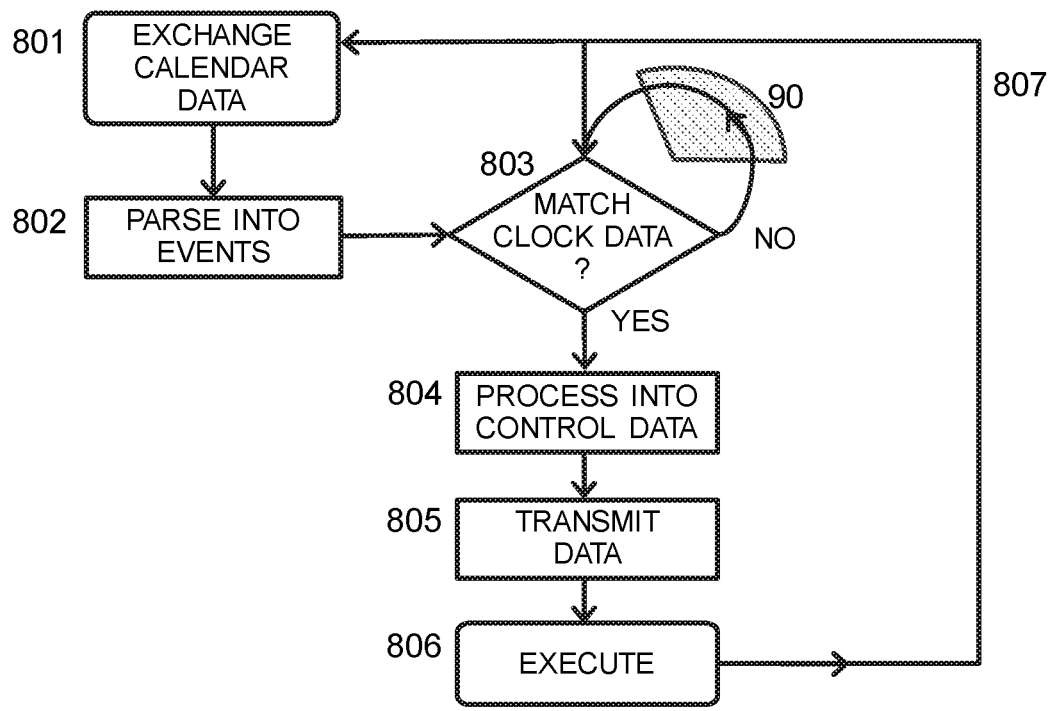
FIG. 8 illustrates a flowchart of another example of a method in accordance with the invention.

Shown in FIG. 8 is a flow chart illustrating another example of a method according to the invention. At the start calendar data is exchanged 801 between a calendar application of a client device and a scheduling system of a machine. Once the calendar data is available to the scheduling system it will parse 802 the data into calendar events. Clock data of calendar events will be checked for whether it matches 803 the current time instance. If not, it will be re-checked with a certain delay as indicated by the half-pie covering the arrow 90. If clock data does match the current time instance, the task data of the calendar event identified by the clock data is processed 804 into machine control data. The machine control data is then transmitted 805 for execution and is executed 806 by the operating system of the machine. Once execution of the machine control data is in progress, the method continues by checking for next matching 804 clock data or it may first re-check for calendar data updates by again exchanging 801 calendar data between the calendar application of the client device and the scheduling system. In addition, these steps may also be performed simultaneously. In some embodiments calendar data may be exchanged on a continuous repetitive basis, say every 10 minutes or 30 minutes or at completion of execution of the current task.

Accordingly, the scheduling system preferably has the parser module and the task module running as individual processes. As this allows to exchange the calendar data as an autonomous repetitive process in parallel to the task module processing a current calendar event.

Thus far, the system and method for scheduling an automation process controlling a machine have mainly been described as in operation during run time. Prior to this, during a phase commonly referred to as build time, the system is prepared in order to be able to set up and configure the system and machine for operation. Accordingly, in build time an interface is available to configure the calendar, the user accounts and user rights. This will also set which automation actions to perform in response to the calendar events managed. Furthermore, this will set which dedicated calendar function blocks are to be included in the automation application in order to perform various functions. These function blocks may include:

Synchronize: to synchronize calendar data between client device and scheduling system or between scheduling systems Add Event: to add an event to calendar data Get Event (Free): retrieve event of specified date and time Import Holidays: retrieve holiday events from an external source of calendar data Export Calendar: provide the system calendar data to client devices or other systems Get Action List: retrieve list of available tasks that may be scheduled as calendar event Look next event to do: look up the calendar event first up Send event per eMail/SMS: exchange calendar data or event by means of eMail or SMS The examples of system and method as described thus far, may take advantage of the platform independency of the iCalendar protocol for exchanging calendar data. Accordingly, different PLCs running different Operating Systems or even a single PLC running multiple different Operating Systems, e.g. having multiple cores or within a Virtual Machine environment, can easily exchange calendar data across these platforms.

Figure 9:
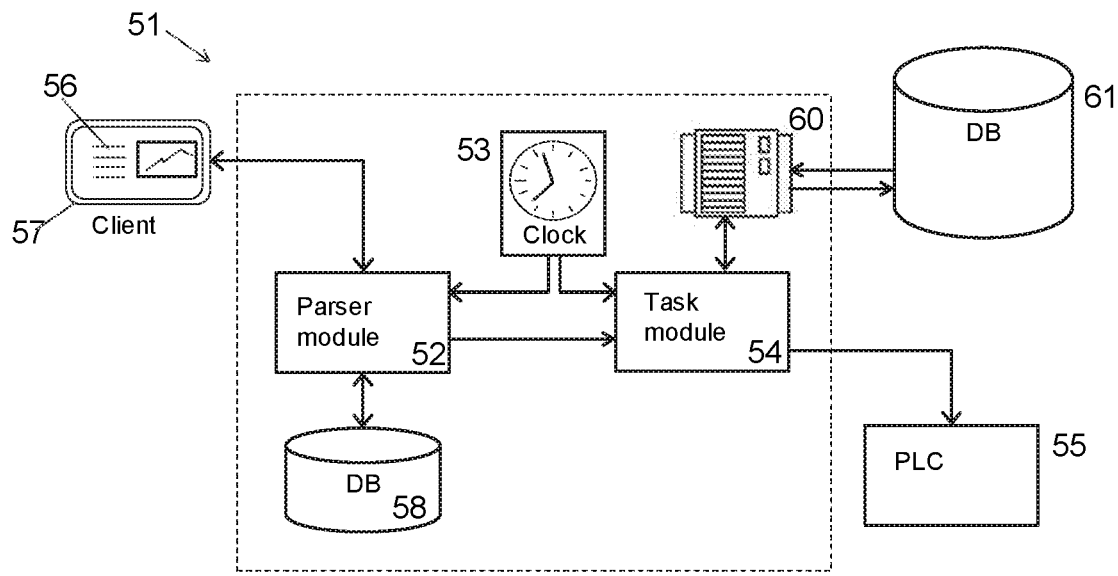
FIG. 9 illustrates another example of a system in accordance with the invention.

Referring to FIG. 9, another example of a scheduling system 51 is shown. The scheduling system may be employed on a PLC or other suitable dedicated controller or server. In this example, the conversion of process automation data into an application program intended to be executed by a PLC 55 is done remotely.

Thereto, the task data of a calendar event includes a script, such as e.g. a Node-Red script, which will instruct the scheduling system 51 to load the script onto an embedded webserver 60 and execute. Execution of the script then retrieves the application program from a remote and secure storage 61, such as a local on-premise server, and deploys the retrieved application program on the PLC 55.

Thus, when the parser module 52 is triggered by the clock 53 to parse the calendar data into task data, the task module 54 continues by processing instructions present in the task data. The instructions indicating to load the script onto the appropriate embedded webserver 60. And the webserver 60 by executing the script retrieves the application program for the PLC 55 from database 61. In this example, the webserver 60 is presented as embedded within the scheduling system. In other examples, it may be embedded independently on the same device as the scheduling system.

So, in this example the task data does not merely contain instructions to be converted by the task module into process automation data, as in previous examples. Moreover, the task data may include only This enables to reduce the amount of conversion required and thereby relieves the scheduling system of processing part, or even all, of the calendar data into a sequential programming language. Furthermore, it allows to dispatch PLC application programs in a timely fashion to a particular PLC.

In particular, when manufacturing machines or other devices containing PLCs that are to be customized for different uses, a controller, such as an edge controller, including the scheduling system is enabled to deploy different application programs to different PLCs. As for the manufacturing process it may be known which machine and associated PLC is produced at which moment. Thus, synchronization of the manufacturing process of the machine with the deployment of the intended PLC application program becomes possible.

Although the present invention has been described above with reference to specific embodiments, it is not intended to be limited to the specific form set forth herein. Rather, the invention is limited only by the accompanying claims and, other embodiments than the specific above are equally possible within the scope of these appended claims. For example, a laundry shop exploiting various washing machines may equip a scheduling system as described to indicate which washing machines are in use or unused. A customer may than remotely reserve a time slot for a particular washing machine. When the laundry is loaded in the washing machine, the customer may leave and will be informed via the calendar application of his smart phone when the laundry washing program will be ready.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A system for scheduling an automation process controlling a machine, comprising:
a parser module configured to parse calendar data, the calendar data comprising calendar events including clock data and task data;
a clock module configured to monitor time instances and trigger the parser module to parse the calendar data to retrieve the task data of a calendar event that is identified by clock data corresponding to a time instance; and
a task module configured to process the task data of the calendar event to obtain machine control data for execution on the machine;
wherein the system is configured to implement an automated calendar event checking process for checking a success or failure of a result from the execution of the machine control data on the machine for the calendar event, the automated calendar event checking process being configured to:
analyze the result from the execution of the machine control data on the machine for the calendar event,
determine one of an occurrence of a successful result from the execution of the machine control data on the machine for the calendar event and an occurrence of a failing result from the execution of the machine control data on the machine for the calendar event, based on the analysis of the result, and
based on the determination, add a new calendar event to the calendar data that reflects one of:
the successful result from the execution of the machine control data on the machine for the calendar event if the occurrence of the successful result is determined, and
the failing result from the execution of the machine control data on the machine for the calendar event if the occurrence of the failing result is determined;
wherein the task data comprises a script and instructions to process the script on a webserver;
wherein processing of the script causes the webserver to retrieve the machine control data from a remote server; and
wherein the task module obtains the machine control data for execution on the machine from the webserver.

2. The system according to claim 1, further comprising:
a credentials module for managing and authenticating user accounts, service accounts, user credentials and service credentials.

3. The system according to claim 1, wherein the clock module is arranged for at least one of:
keeping time independently;
retrieving time indications from an external time indicator provider; or
synchronizing the time with an external time signal.

4. The system according to claim 1, wherein at least one of the parser module or the credentials module are configured for exchanging calendar data with a client device comprising a calendar view application;
wherein the client device includes at least one of:
a machine user interface, such as SCADA or HMI; or
a smartphone, tablet or computer.

5. The system according to claim 1, wherein the parser module, the clock module and the task module are distributed over at least one of a Real Time Operating System RTOS, a server, a cloud infrastructure or a Programmable Logic Controller PLC.

6. The system according to claim 1, further comprising a storage module for storing calendar data.

7. The system according to claim 6, wherein the storage module comprises a cloud infrastructure.

8. The system according to claim 1, wherein the task data comprises instructions to send calendar data to at least one of a second scheduling system or to at least a second PLC.

9. The system according to claim 1, wherein at least one of the parser module or the credentials module are configured for exchanging calendar data with a second scheduling system according to claim 1.

10. A computer implemented method for scheduling an automation process controlling a machine, comprising:
exchanging calendar data between a client device and a machine;
parsing the calendar data to retrieve calendar events defined by clock data and associated task data;
monitoring time instances and for clock data of a calendar event matching a time instance;
processing the associated task data of the calendar event to obtain machine control data,
transmitting the machine control data for execution on the machine; and
implementing an automated calendar event checking process for checking a success or failure of a result from the execution of the machine control data on the machine for the calendar event, the automated calendar event checking process including:
analyzing the result from the execution of the machine control data on the machine for the calendar event,
determining one of an occurrence of a successful result from the execution of the machine control data on the machine for the calendar event and an occurrence of a failing result from the execution of the machine control data on the machine for the calendar event, based on the analysis of the result, and
based on the determination, adding a new calendar event to the calendar data that reflects one of:
the successful result from the execution of the machine control data on the machine for the calendar event if the occurrence of the successful result is determined, and
the failing result from the execution of the machine control data on the machine for the calendar event if the occurrence of the failing result is determined;
wherein the associated task data comprises a script and instructions to process the script on a web server;
wherein processing of the script causes the webserver to retrieve the machine control data from a remote server; and
wherein the task module obtains the machine control data for execution on the machine from the web server.

11. The method according to claim 10, further comprising executing the control data.

12. A non-transitory computer readable storage medium storing a software program comprising program code instructions, which when executed by a computer, causes performance of:
exchanging calendar data between a client device and a machine;
parsing the calendar data to retrieve calendar events defined by clock data and associated task data;
monitoring time instances and for clock data of a calendar event matching a time instance;
processing the associated task data of the calendar event to obtain machine control data,
transmitting the machine control data for execution on the machine; and
implementing an automated calendar event checking process for checking a success or failure of a result from the execution of the machine control data on the machine for the calendar event, the automated calendar event checking process including:
analyzing the result from the execution of the machine control data on the machine for the calendar event,
determining one of an occurrence of a successful result from the execution of the machine control data on the machine for the calendar event and an occurrence of a failing result from the execution of the machine control data on the machine for the calendar event, based on the analysis of the result, and
based on the determination, adding a new calendar event to the calendar data that reflects one of:
the successful result from the execution of the machine control data on the machine for the calendar event if the occurrence of the successful result is determined, and
the failing result from the execution of the machine control data on the machine for the calendar event if the occurrence of the failing result is determined;
wherein the associated task data comprises a script and instructions to process the script on a web server;
wherein processing of the script causes the webserver to retrieve the machine control data from a remote server; and
wherein the task module obtains the machine control data for execution on the machine from the web server.

13. The system according to claim 1, further comprising:
a programmable logic controller (PLC) configured to execute the machine control data to control the machine, and to add the new calendar event.

14. The system according to claim 1, wherein the one or more results are added as a new calendar event to the calendar data for reporting thereof.

15. The system according to claim 14, wherein the automation process comprises a manufacturing process, the machine control code obtained from the task data of the calendar event is executed on a programmable logic controller (PLC) to control the manufacturing process via the machine, and the task data comprises a command including one of start, hold, stop, or switch for one or more specific tasks of the manufacturing process.

16. The system according to claim 1, further comprising a credential module and a plurality of PLCs, each of the PLCs hosting a parser module, clock module, and task module and having associated therewith calendar data, the credential module selectively controlling access by one or more client devices to the calendar data of the PLCs, each of the PLCs being configured to perform control of the automation process, via the machine, according to machine control data from task data of a calendar event from their associated calendar data,
wherein the PLCs are configured to exchange calendar data with one another, and at least two different PLCs from the PLCs are configured to run different operating systems.

17. The system according to claim 1, wherein the new calendar event describes the result from the execution of the machine control data on the machine for the calendar event, and provides one of a first visual indication and a second visual indication that is different than the first visual indication, the first visual indication corresponding to the determined successful result from the execution of the machine control data on the machine for the calendar event, the second visual indication corresponding to the determined failing result from the execution of the machine control data on the machine for the calendar event.

18. The system according to claim 1, wherein the new calendar event is added to the calendar data in a time slot immediately after a time slot for the calendar event.

* * * * *